United States Patent Office 3,481,144
Patented Dec. 2, 1969

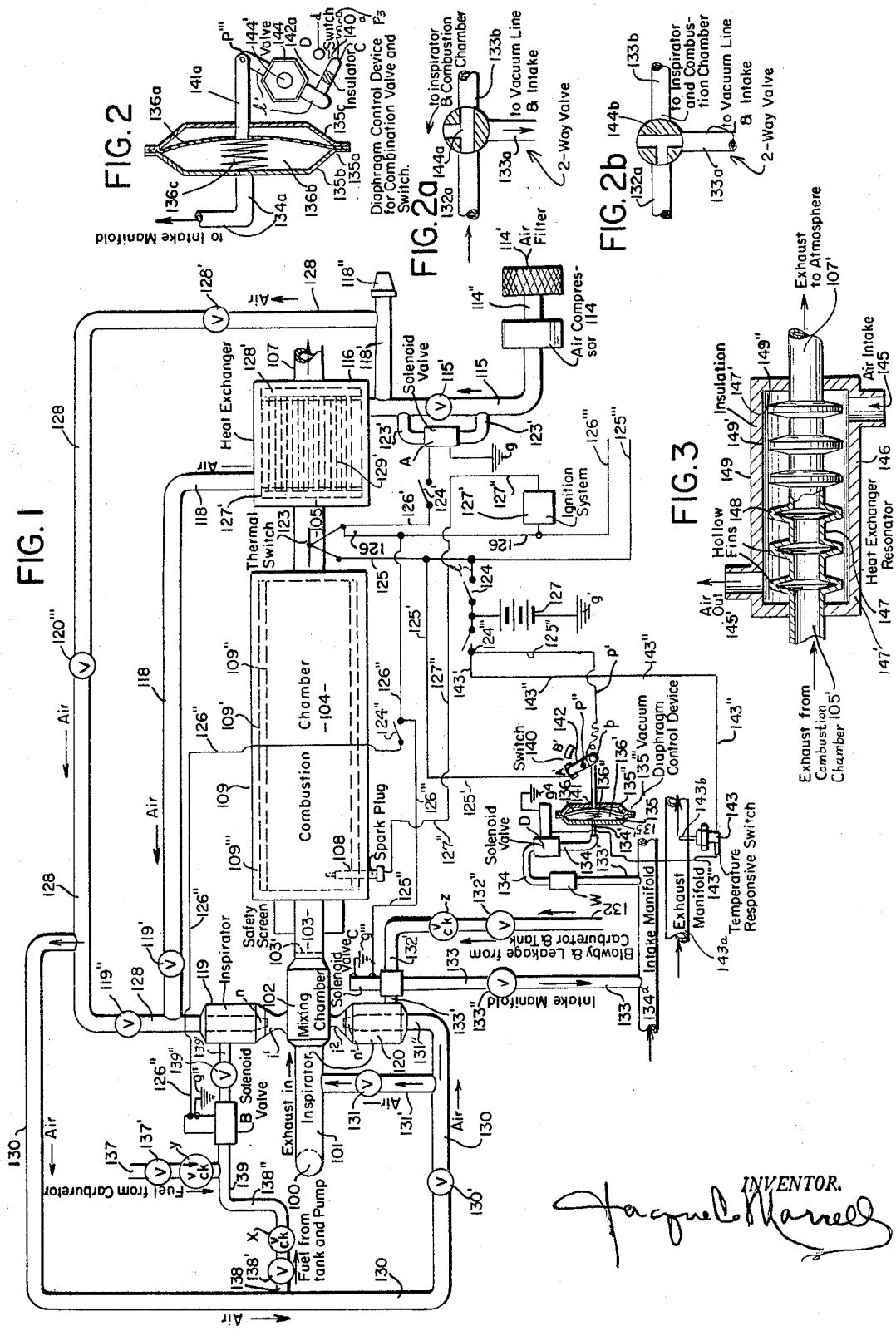

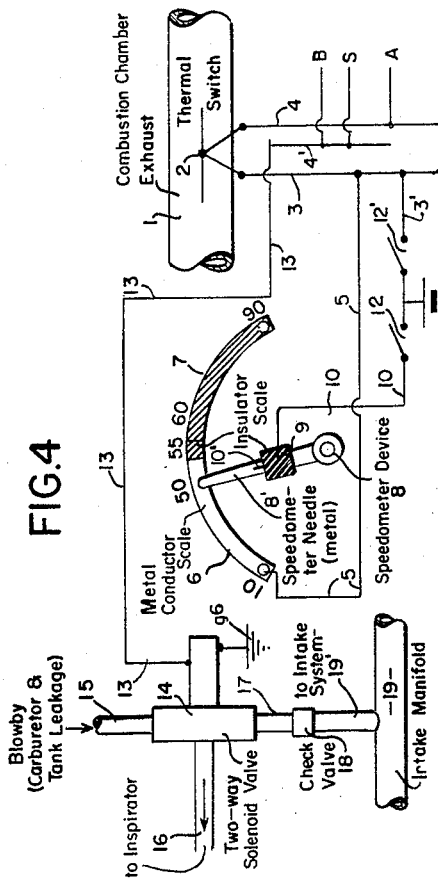
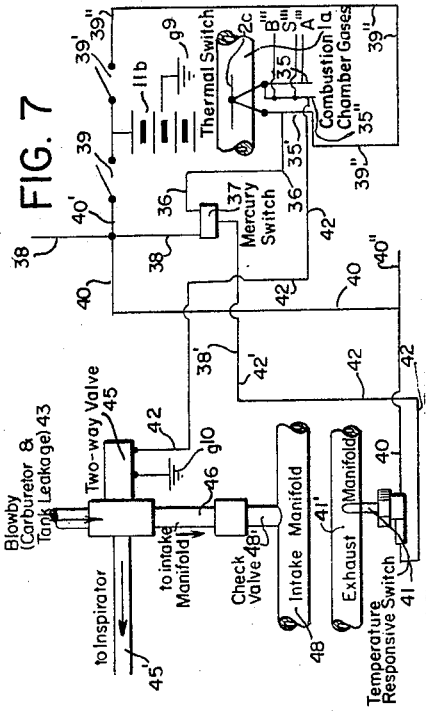
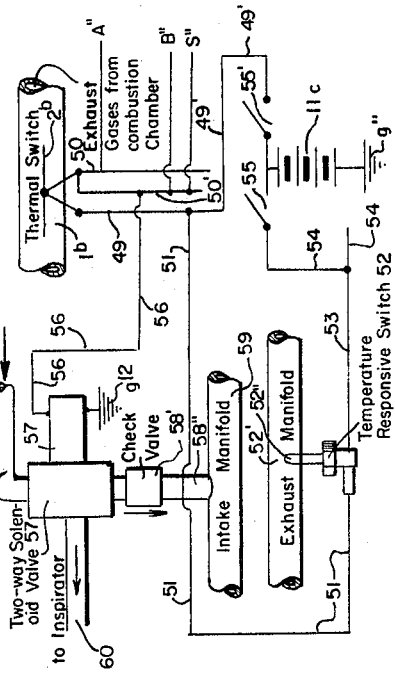

3,481,144
APPARATUS AND PROCESS FOR TREATMENT OF EXHAUST GASES FROM INTERNAL COMBUSTION ENGINES AND CONTROLS FOR THE SAME
Jacque C. Morrell, 8 Oxford St.,
Chevy Chase, Md. 20015
Continuation-in-part of application Ser. No. 526,810, Feb. 11, 1966. This application Feb. 27, 1967, Ser. No. 618,609
Int. Cl. F01n 3/14, 3/12
U.S. Cl. 60—30                                7 Claims

ABSTRACT OF THE DISCLOSURE

The invention relates to substantially complete combustion of the undesirable components of the exhaust gases when the concentration of the latter is insufficient to support combustion. This is accomplished by supplying additional fuels and a forced supply of air directly to the combustion zone or chamber to increase the temperature when the latter falls below about 1450° F. The fuels supplied are both a primary and secondary character, the former from the regular fuel supply of the engine and the latter from the crankcase (blowby) and vents of the carburetor and the fuel tank which would normally escape into the atmosphere and pollute the same. My present improvement relates to a number of special control systems alternative, but not equivalent, to each other which permit controlling, cutting off and diverting the secondary fuels and the primary fuels (and additional air) from the combustion chamber. Also, when the speed of the automotive vehicle, or the temperature in the exhaust manifold, exceeds a predetermined point at which the exhaust gases contain the minimum of objectionable components and require the minimum (or no) treatment, no added fuels are introduced into the combustion chamber. At this predetermined point the secondary fuels may be simultaneously diverted to the intake manifold to be utilized as engine fuel instead of being discharged into the atmosphere as pollutants. The predetermined speed and the temperature of the exhaust manifold referred to are related to each other and are an index of the exhaust gas composition with respect to its normal combustible components without added fuels.

BACKGROUND OF THE INVENTION

This application is a continuation-in-part of my patent application Ser. No. 526,810 filed Feb. 11, 1966 now U.S. Patent 3,306,035 issued Feb. 28, 1967 which, in turn, is a continuation-in-part of patent application Ser. No. 328,397 filed Dec. 5, 1963 since issued on May 3, 1966 as Patent No. 3,248,872. The prior art generally relates to the treatment of exhaust gases related, in one form or another, to attempts to oxidize or burn the undesirable combustible components contained in the exhaust gases to harmless products. In one approach using a catalyst the latter proved too sensitive to prevailing temperatures to be sufficiently practical. Others failed to take into account the necessary conditions for complete combustion or to remedy the same. Others used oversimplified expedients which proved to fall short of solving the problem.

SUMMARY OF THE INVENTION

The basic invention disclosed in the aforementioned patent and patent application relates to substantially complete combustion of the undesirable components of the exhaust gases when the concentration of the latter is insufficient to support combustion. This is accomplished by supplying additional fuels and a forced supply of air directly to the combustion zone to increase the temperature when the latter falls below about 1450° F. The fuels supplied are both a primary and secondary character, the former from the regular fuel supply of the engine and the latter from the crankcase (blowby) and vents of the carburetor and the fuel tank which would normally escape into the atmosphere and pollute the same. My present improvement relates to a number of special controls alternative, but not equivalent, to each other which permit cutting off the primary fuels (and additional air) and, in effect, discontinuing the operation when the speed of the automotive vehicle (or the temperature in the exhaust manifold) exceeds a predetermined point at which the exhaust gases contain the minimum of objectionable components and require the minimum (or no) treatment. At this predetermined point the secondary fuels are simultaneously diverted to the intake manifold to be utilized as engine fuel instead of being discharged into the atmosphere as pollutants. The predetermined speed and temperature referred to are related to each other and are an index of the exhaust composition.

BRIEF DESCRIPTION OF THE INVENTION

The present invention relates to the process and means of accomplishing the invention discussed in the summary particularly of temporarily cutting off the operation of the combustion zone for burning the undesirable components in the exhaust gas as well as the added primary fuels and air and to divert the secondary fuels (blowby) and vapors escaping from the vents of the carburetor and fuel tanks into the intake manifold to be utilized as fuels for the engine instead of polluting the same. The means for doing this are described in connection with the drawings immediately following.

BRIEF DESCRIPTION OF THE DRAWINGS

The figures in the drawings are 1 to 7, inclusive. FIGURE 1 is a flow diagram partly in side elevation which shows the means and the operation of the process to accomplish the invention described in the summary above and particularly the control systems for the passage of the air and of the primary and secondary fuels added to the exhaust gases to facilitate combustion of the combustible components in the exhaust gases in a combustion chamber provided for the purpose. A diaphragm device is also shown for cutting out the supply of primary fuel and additional air and for diversion of the secondary fuels into the intake manifold when the temperature of the exhaust gases reaches a predetermined temperature.

FIGURE 2 shows a cross-section of a diaphragm device (as in FIGURE 1) combined with a valve and switch as an alternative to the diaphragm control device shown in FIGURE 1. FIGURES 2a and 2b illustrate the core of the valve in connection with its operation.

FIGURE 3 is a side elevation view of an alternative heat exchanger to that shown in connection with FIGURE 1.

FIGURES 4 to 7, inclusive, are all flow diagrams relating to alternative control systems to the system employing the diaphragm device shown in connection with FIGURE 1. FIGURE 4 shows a speedometer device to correlate a predetermined speed of the vehicle to the control device for cutting off primary fuel and air and to divert secondary fuels to the intake manifold. FIGURES 5 to 7, inclusive, show temperature responsive switches in the exhaust manifold to be used in connection with the systems for the same purpose referred to above.

DESCRIPTION OF THE PREFERRED EMBODIMENT

The invention described in FIGURE 1 in connection with the summary, and brief description of the invention, and the drawings connected therewith. It represents the preferred embodiment, although the flow diagrams shown in FIGURES 2, 4, 6 and 7 are alternative, but not equivalent, are control systems which could be used instead of that shown in FIGURE 1 to accomplish the same purpose. However, FIGURE 1 as a whole shows the preferred embodiment.

DISCLOSURE OF THE INVENTION

This invention relates to internal combustion engines and more particularly to apparatus or means and process for removing the objectionable and toxic components of exhaust gases from internal combustion engines by conversion of the same to harmless components.

The question of air pollution especially by automobile exhaust gases has focused attention on abatement legislation on a national scale. Carbon monoxide, a highly toxic substance in which 0.1% is dangerous to life is present in exhaust gases from automobiles to the extent of 9.0% to less than 1%, depending on operating conditions; and may average about 4% taking all conditions into account such as idling, heavy traffic, starting and stopping which is the norm in city driving where the menace is greatest. Trucks, busses and taxis all add to the menace, as even more traces of carbon monoxide may be injurious and disagreeable causing headache, dizziness and the like; and in addition unburned and partially burned or oxidized hydrocarbons in the exhaust and carbonaceous materials not only are most disagreeable and malodorous but are assumed to be carcinogenic and therefore present the dangers of possible cancer. Other combustible components in the exhaust are hydrogen, and other compounds therein may include oxides of nitrogen, sulphur, and of metals principally lead.

The problem of removal or conversion of these objectionable components is a very complicated one mainly because of the many requirements, which must take into account changes in the composition and the ratio of gasoline-air mixtures from lean to rich; traffic conditions including starting and stopping and variable speeds; changes in air exhaust gas ratios; exhaust gas stream temperatures and others all of which affect the problem. In addition the economic factors of minimum size, low cost, durability under all operating conditions and other factors must be considered.

The principal approach for the solution of the problem to date has been the use of relatively low temperature oxidation catalysts, but these have been found to be very sensitive to temperatures above about 1300° F. to about 1400° F. under which conditions they rapidly lose efficiency and deteriorate. Various devices have been proposed to overcome these difficulties but have generally not been proven satisfactory and these operating difficulties together with initial and replacement cost of the catalyst has rendered these types unsatisfactory from a practical viewpoint. Other approaches to the solution of the problem like "supertuning" the engine to improve its operation on the one hand, and merely injecting air into the intake manifold are superficial for the solution of the problem.

I have overcome all of these problems in connection with my invention by utilizing relatively high temperatures in the range of about 1400° F. to 2200° F. Preferably the temperatures I employ from a practical viewpoint are in the range of about 1450° F. to 1650° F., in effect above and outside the temperature range of those processes which employ sensitive catalysts which deteriorate at temperatures within this range and lower, but necessary and effective for substantially complete combustion of the undesirable components in the exhaust in accordance with my invention.

As noted above the concentration of combustible components of the exhaust gases may vary over a wide range dependent on conditions of operation of the engine, and in many conditions and in general is insufficient to maintain steady and continuous combustion. One of the special features of my invention is the addition of a fuel to the exhaust gas such as gasoline or a mixture thereof with air, e.g., that is from the carburetor or intake manifold or of carburetor composition in general from the regular fuel supply including the fuel tank of the spark ignition engines and vehicles associated therewith (or in the case of diesel engines also from the regular fuel supply of the type used in connection therewith. The diesel system may have a flow system such as shown, for example in FIG. 1 of my prior Patent 3,306,035 referred to hereinbefore.) A supply of air is added to the exhaust fuel mixture in sufficient amounts to bring about the necessary conditions of temperature and concentration for complete combustion of the combustible components in the exhaust gas that is the carbon monoxide, unburned and partially burned hydrocarbons, carbon particles and the like; as well as the added fuel to form relatively harmless carbon dioxide and water upon combustion.

With regard to the added air, it has generally been found necessary to employ a forced supply of the same by the use of an auxiliary fan, pump, compressor or other suitable means in the case of spark ignition engines (and the regular compressor in connection with diesel engines). The air used in the above connection is preferably preheated by heat exchange with the hot exhaust gases.

Another feature of my invention is the addition to the exhaust gas or to the air, etc., added to the same, of the gasoline and air which leaks from the cylinders of the engine into the crankcase. This mixture is referred to as "blowby" and it is normally vented to the atmosphere which is of course objectionable. The use of the blowby in the manner described is not sufficient alone to maintain combustion of the exhaust under many of the varying conditions of operation of the engine, but the operation serves the double purpose of economy in assisting the added fuel for combustion of the exhaust components and getting rid of a nuisance at the same time. Similarly the gasoline vapors escaping from the vent to the atmosphere of the carburetor and of the fuel tank which are also a nuisance like the blowby may be collected (by suitable means around the vents of the same and used by me in the same manner as the blowby). It is to be understood, however, that these components are actually air pollutants which would have normally escaped into the atmosphere and as such are not to be confused with the added primary fuel of the type and from a source supplied to the internal combustion engine which are drawn directly from the carburetor or fuel tank and pump and would otherwise normally be supplied to the engine as fuel. The added air must at all times be in sufficient amount to substantially completely convert all combustible components present including those in the exhaust as well as those added to carbon dioxide and water.

Combustion takes place in a suitable zone completely separate and apart from the engine operation; and a separate combustion chamber is provided for this purpose. This is an important feature of my invention since it has been found necessary to operate the engine and the vehicle for best practical results in the production of exhaust gas of varying composition with regard to combustible and concomitantly of the undesirable components. To state this question in a different manner it is applicant's objective to solve the exhaust problem without substantially interfering with the required conditions for practical operation of the engine and the vehicle.

In connection with another feature of my invention; during the operation a great amount of heat is evolved during the above said combustion and to take care of this condition I prefer to make use of a suitable heat exchanger following the combustion chamber to remove the heat from the hot combustion products leaving the chamber which at the same time heats the incoming air employed for the combustion of the exhaust gases and added fuel. This heat may also be utilized elsewhere as desired.

The heat exchange means employed may be of various types and forms, for example, the use of double walls in the combustion chamber or pipe coils around the same, but generally I prefer separate heat exchange means as described hereinafter, and preferably one which may also serve the purpose of a resonator or muffler.

In all of the above steps or combinations thereof the exhaust gas originates in an internal combustion engine of the spark ignition which is provided with an exhahust manifold or exhaust pipe to convey the exhaust gas to the combustion chamber. A forced supply of air is mixed with the exhaust gas prior to entering the combustion chamber generally in excess of, or at least to the extent required for practically complete combustion. In the preferred modification of my invention the air is heat exchanged with the hot gases leaving the combustion chamber. The added fuel which in the case of spark ignition engines is gasoline from the fuel supply preferably after carburetion in the regular or main carburetor or with air in a separate carburetor i.e. of the types used in "Go Karts" or "chain saws") as stated is introduced for the purpose of maintaining steady combustion including the components of the exhaust gas. In addition to the added fuel the blowby or gasoline-air mixture from the crankcase and leakage fuels from the carburetor and fuel tank vents are added to the mixture for combustion in the combustion chamber. The added fuel is introduced into the exhaust gas-air mixture prior to entering the combustion chamber and in general as found suitable or necessary. Alternatively all the components may be introduced into the chamber at a common point. Generally the combustible mixture may be prepared in a mixing zone prior to entry in the combustion zone wherein complete combustion may be effected. To facilitate the latter air may be introduced as found desirable or necessary at several points along the length of the combustion chamber. The air may be introduced by a compressor, blower, fan or pump through a separate line after filtering or it may, if desired, be drawn from the filtered main supply although an independent supply is desirable. The power required for the means of supplying the forced air supply namely compressors, pumps, blowers, fans, and the like, may be taken off the main crankshaft, e.g., thru a gear train. The source of the power is the engine itself and may be used in any convenient manner thru pulleys from the fan shaft, the main water or fuel pump, the generator, etc., as found convenient; or in some special cases an electric motor may be used as a source of power for this purpose (and may have some advantages) and this may receive its power from the battery and generator. It is desirable in the process that the exhaust gases be drawn from the manifold at maximum temperature. Some additional mixing of the combustion components will be required and take place in the combustion chamber, and in any event all of the combustion should take place and be substantially completed therein. The heat generated by the combustion may be removed in large part and utilized to preheat the incoming air by heat exchange. It is recognized that combustion may be initiated and proceed to some extent at the point of introduction of the pre-heated air and added fuel as well as the blowby gases, especially where the exhaust gases are withdrawn from the manifold at the highest temperature practicable.

Th motive power required for the means of supplying air and gasoline or fuel generally which may be those supplied to the engine (and are normally supplied thereto) (i.e. from the same source) or provided especially for the combustion chamber is derived from the motive power of the engine by any suitable means such as gears, pulleys and the like. In the case of spark ignition engines separate pumps, compressors and the like may be required, whereas in the case of diesel engines the same means employed to supply the air and fuel for the engine may likewise be used to supply the combustion chamber.

Another feature in connection with my invention, while not absolutely necessary for the operation thereof, is highly desirable and gives substantially improved results is the use of heat resistant refractory filling materials or lining and the like for the combustion chamber. Basically the simple ceramic and other high temperature refractories may be employed such as fireclays, fireclay brick, silica, magnesite, high alumina, chrome and zircon refractories, silicon carbides, sillimanite, mullite, refractory porcelain shapes and others, but it is contemplated employing also the simple refractories. Also the refractories may be coated and/or impregnated if desired with refractory oxides and metals or compounds which may be effective to some degree as high temperature heat resistant catalysts; the overriding requirement being that they are resistant to temperatures of the order referred to above. I may also use rugged oxides i.e. resistant to high temperatures as quasi-catalysts as such or as surfacing agents of aluminum, magnesium, titanium, zirconium, beryllium and the rare earths such as thoria, ceria and the like in a great variety of shapes.

I may also employ the noble metals such as platinum, palladium, rhodium and the like as surfacing agents to promote combustion. The refractories are preferably of suitable sizes and a great variety of shapes (e.g. short hollow cylinders, saddles and the like) so that when placed in the combustion chamber the interstices permit passage of the exhaust gases (and added air and fuel) to promote combustion of all combustible components without undue back pressure. Also high temperature alloys may be employed in combination with or instead of the refractories mentioned although the latter are preferred. In this connection it is emphasized that refractory surfaces, even if they consist only of the chamber lining, and/or grids or checker work greatly assist combustion. Also in any case the chamber must be made of heat resistant or refractory materials. However, such refractories should not impede the flow of gases or induce undesirable back pressures, so that both the disposition of the catalysts and their shape should conform to this requirement.

The refractory surfaces transmit heat from the burning mixture of gases once initiated and increase both the rate of ignition and of combustion and/or oxidation event to the extent of inducing surface and in some cases flameless combustion. The influence of the heat refractories is so pronounced that its effect has been designated as surface combustion. In the presence of silica, fireclay and various oxide materials mentioned herein combustion chain reactions may be catalyzed even at lower temperatures than those mentioned. Also heat transfer temperature effects coupled with local turbulence caused by surface roughness of a bed, for example, of broken refractory materials (which I also contemplate using) or of irregularly disposed refractory shapes and forms are of major importance in surface combustion at high furnace temperature. I may also employ grids functioning like checker work in a recuperative furnace and this, of course, is also made of refractory material. High temperature alloys may also be used in this connection although not equivalently.

The present improvement applies particularly to further simplification of and fuel economy in the operation of my invention by taking advantage of the conditions in the various operations and modes and phases in the operation of the automotive vehicle, e.g., idling, urban, suburban and low-speed highway cruising, e.g., may be included in the range of from 10 to 50 miles per hour and higher speed highway cruising or driving, from 50 to 65 miles per hour and above.

Exact divisions of these modes or phases are not practical, but suggested ranges are: idling and very low-speed city or urban travel, e.g., 10 to 15 miles per hour, and 15 to 30 miles per hour for urban and suburban travel 30 to 50 miles per hour for suburban and low-speed highway cruising, and 50 to 60 miles per hour and above for higher and high-speed cruising on the open highway.

The exact divisions are not to be cited in a limiting sense but are merely examples.

It is well known that carbon monoxide is present in exhaust gases, e.g., to the extent of about 9% maximum during idling to less than 1% in fast driving dependent on operating conditions generally being greatest during idling and progressively decreasing with increase in speed of the engine and vehicle generally. When the engine is idling incomplete combustion of the air fuel mixture leaves about 8–9% of carbon monoxide unburned and in excess of 3% hydrogen. Generally, also the combustion of these high concentrations of carbon monoxide and hydrogen is sufficient to raise the temperature of the exhaust gases to above 1400° F. whereas at about 45 miles per hour the amount of combustibles (CO, $H_2$, etc., present) may be sufficient only to maintain the temperature of the exhaust gases and the added fresh air close to that of the exhaust gases leaving the exhaust manifold, e.g., from about 900° F. to 1000° F. or much lower because of diminishing content of CO, etc., in the said exhaust gases will increase the speed. It is noted however that stored heat even when the car stops suddenly and temperatures drop on idling may be in excess of 1400° F. which of course is related to heat of combustion, even when catalysts, etc., are used to promote combustion of combustibles in the mixture of exhaust gases and added fresh air.

Reverting to the temperature of the exhaust gases and speed relationship which I employ in connection with process control in connection with the use of added fuel and forced air addition the following approximate data shows this relationship.

Table I

| Speed: | Temperature of exhaust gases leaving manifold, ° F. |
|---|---|
| Engine idling | 450–500 |
| 30 miles per hour | 750–800 |
| 40 miles per hour | 850–900 |
| 50 miles per hour | 1100–1150 |

For complete oxidation of the combustibles in the exhaust gases employing 40 to 50% and above of fresh air added to the exhaust gases for this purpose. The temperature of the mixture may show the following relationship to the speed in an approximate manner.

Table II

| | ° F. |
|---|---|
| Engine idling | 325–400 |
| 30 miles per hour | 575–625 |
| 40 miles per hour | 675–800 |
| 50 miles per hour | 800–1000 |

The above data represent a range and other data could be presented dependent on the type of car and/or the engine and its characteristics duration of operation and other factors for example in one set reported (using a four-cycle spark fired engine with a piston displacement of about 220 cu. in.) the temperature of the exhaust gas entering a catalytic bed presumably following the normal practice with the air mixed therein by inspiration the following was observed: Idling 400° F.; 30 miles per hour 450° F.; 40 miles per hour 625° F.; and 50 miles per hour 780° F. Comparable to these latter data and in context therewith acceleration and deceleration showed from 600° F. to 700° F. These data are comparable to the lower range in Table II especially at idling and for 40 to 50 miles per hour. In any event the data illustrate the principle both of a definite and very considerable rise in temperature in the exhaust manifold with increase in speed and that there is a definite relationship between speed although it may vary for different types of engines and for vehicles which determine the setting of the controls.

These data are shown for illustration only as they may vary somewhat and even considerably for different types of vehicles and engines characteristics and conditions, i.e., upon the particular type of engine and the type of operation employed for it and the controls may be set accordingly.

In the above connection the temperature in the exhaust manifold before mixing with air is the controlling one employed in connection with the present invention although even in the latter case a relationship may be established.

In the above connection it is noted that the air to exhaust ratios should be controlled with respect to the overall concentration of combustibles in the exhaust gas which as a practical matter may be determined under the requirement during idling and at high speed and varying proportionally between.

It has been noted that the carbon monoxide content in the exhaust gases of the automotive vehicle with spark ignition engine may vary widely depending on operating conditions from a maximum about 9% during idling and low speeds to less than about 1% (the latter especially while driving on an open highway and cruising at relatively high speeds), and may average about 4% taking all conditions into account such as idling, heavy traffic, starting and stopping and the like. Under similar conditions the hydrocarbon content which may vary in the high range from 2000 to 6000 parts per million may also follow a similar pattern being on the high side for example in excess of 2000 parts per million and may for example during cruising at high speeds be reduced to less than 300 parts per million.

During acceleration the carbon monoxide content tends to be reduced to a minimum and while the hydrocarbons as such are very considerably reduced intermediate oxidation products of the hydrocarbons such as the aldehydes remain fairly high and they of course must be eliminated which is one of the objects of my invention. On the other hand in deceleration the carbon monoxide may be reduced considerably while the hydrocarbons content may remain at high level and in general tends to increase.

It is noted in this connection that the setting of the controls related to the speed of the engine and/or the vehicle as well as the corresponding temperature in the intake manifold of the engine at which the combustion process of my invention is made with due regard to the composition of the exhaust gases (which may also be correlated with these factors) so that no substantial amounts of undesirable components remain therein; otherwise, the saving of fuel is pointless. This must take account of the type and characteristics of the engine and vehicle, but the setting may be readily accomplished. In general for the data shown above a speed of about 50 to 60 miles per hour (more or less) corresponding for example to an exhaust manifold temperature of about 750 to 850° F. and above will accomplish this purpose. It is emphasized particularly that variations in the correlation for any type of engine or vehicle may be readily established and the necessary adjustments made.

In my aforesaid patent and patent application, I employ added fuel (in the case of spark ignition engines, gasoline or mixtures of gasoline and air; and diesel fuel in the case of diesel engines) to the exhaust gases to increase the combustibles in the same so as to raise the temperature in the combustion chamber above about 1400 to 1450° F. together with the use of a forced air supply sufficient to bring about complete or practically complete combustion of the combustibles in the exhaust gases (carbon monoxide, unburned as well as partially burned hydrocarbons, carbon, etc.) in addition to burning the blowby or crankcase gasoline and other secondary fuels normally pollutants such as those emanating from around the carburetor and similar leakages. The objective is to get rid by complete combustion of all of the combustible materials in the exhaust gases and objectionable materials generally. The amount of forced air added should be in sufficient excess to assure complete combustion of all combustibles including those in the exhaust gas originally as well as the secondary objectionable fuels such as the blowby etc., and including the complete combustion of the added primary fuel when such addition is necessary.

It is noted in accordance with the above data that for normal operation of the engine and vehicle that the exhaust gases resulting from the idling operation should, when raised to the proper temperature in accordance with my process, have sufficient combustibles to require little or no addition of fuel. Exhaust gases resulting from operations between the idling operation and very low speeds, e.g., 10 miles per hour on the one hand and the usual low-travel speeds in the city, e.g., 10 to 30 miles per hour on the other hand, as well as highway cruising speeds, e.g., 30 to 45 miles per hour, all contain sufficient carbon monoxide, hydrocarbons and combustibles generally to be a great nuisance as well as a danger; however, they are insufficient in concentration to maintain combustion unless sufficient additional fuel of one type or another is added as above indicated to maintain the temperatures in the combustion chamber above about 1400 to 1450° F. The third phase of operation, namely cruising, e.g., at about 50 to 60 miles per hour and above, contains the least amounts of the objectionable combustibles and also would require excessive amounts of added fuel to maintain proper combustion conditions, and it is with this phase of operation that my present improvement is particularly directed; although other aspects at the lower phases and modes of travel are within the scope of my present invention aimed at overcoming all of the problems referred to herein.

It is especially noted that I may employ all of the devices and process steps including the use of refractories and quasi-catalysts in my present improvement as have been set forth in the aforesaid patent and patent application in addition to those discussed herein, the objective being in all cases the elimination, or conversion to harmless products of the objectionable carbon monoxide hydrocarbons, both unburned and partially burned, as well as blowby or crankcase gasoline and evaporation losses from the carburetor, and the like, as has been either fully discussed in the said patent and patent application. It is also an objective of the present invention to utilize these normally wasted products when not otherwise disposed of as engine fuels in a novel manner.

As has been pointed out above, the content of combustibles in the exhaust gases is roughly inversely proportional to the speed and the latter more or less directly proportional to the temperature of the gases so that I may in the first instance make use of a thermal switch in the exhaust manifold to cut out the operation of the spark plug in the combustion chamber and to stop the flow of primary fuel thereto as well as the added supply of air for the combustion of both the primary and secondary fuels when introduced into the combustion chamber of my apparatus and process while simultaneously diverting the secondary fuels (consisting of blowby and evaporation or leakage from the carburetor and tank which are normally pollutants) to the intake manifold to be used as fuel for the engine.

The manner in which this is accomplished is shown in connection with the description of FIGURES 1 to 7 inclusive.

FIGURE 1 is a flow diagram partly in side elevation and in cross section which has reference to my invention for the treatment of exhaust gases from internal combustion engines of the spark ignition type and associated vehicles and especially shows the control systems for the passage of air and of primary and secondary fuels, for the combustion of the combustible components of the exhaust gases in a combustion chamber, and a diaphragm device for the diversion of the secondary fuels into the intake manifold when the temperature of the exhaust gases in the exhaust manifold reach a predetermined temperature.

FIGURE 2 shows a cross-section of the diaphragm device combined with a special two-way valve (FIGURES 2a and 2b being an open view of the latter) and a special switch as an alternative to accomplish the diversion of secondary fuels to the intake manifold. FIGURE 2a is a side elevation of the valve shown in FIGURE 2 and shows a cross-section of the core of the valve illustrating the flow of the secondary fuels therein. FIGURE 2b shows another view of the same valve in which the core has been turned to show the new direction of flow of the secondary fuels. FIG. 2 also shows a switch and valve combined.

FIGURE 3 is a side elevation of a simplified form, partly in cross-section, of the heat exchanger which the hot gases from the combustion chamber flow to be heat exchanged with the incoming air to the combustion chamber.

FIGURES 4 to 7, inclusive, are all flow diagrams and show control systems with devices alternative to the diaphragm device shown in FIGURES 1 and 2 to control the flow of the secondary fuels and divert the same from the combustion chamber to the intake manifold and at the same time relate to FIGURE 1 in controlling the air supply and primary fuel for the combustion chamber and the spark plug in the same. FIGURE 4 shows a speedometer control device relating speed to the diverting mechanism. FIGURES 5, 6 and 7 are alternative devices to accomplish the same purpose of diversion of the secondary fuels as explained by the use of a temperature responsive switch in the exhaust manifold at a predetermined temperature.

Referring to FIGURE 1, air is drawn through the filter 114' and line 114'' and introduced into the system as a forced air supply by means of a compressor, blower, fan or other suitable means of forced air supply shown at 114, which may be operated by a gear train attached to the main shaft of the engine, or may be otherwise suitably powered by means of a pulley or gear off other shafts, e.g., the principal fan and others as found convenient or desirable to obtain a forced supply of air. Alternatively an electric motor powered by the battery and generator may if desired be employed. The air passes through line 115 and is normally controlled by manual control valve 115'. However to meet the needs of changing conditions and of increased supply of air for steady and complete combustion additional air may be supplied through bypass 123' controlled by means of the solenoid valve A electrically actuated, as later described, in response to changing temperatures in the combustion chamber 104 more fully described below. Safety valve 118'' acts to avoid excess pressure of the air.

The air passes over heating tubes 129' in heat exchanger 116 where it receives heat by indirect heat exchange with the hot gases from the combustion chamber 104 passing through the tubes of the heat exchanger. The hot gases are in turn cooled. The heated air leaves the heat exchanger through line 118 controlled by valve 119' and enters line 128 passing into inspirator 119 and through the nozzle n of the inspirator and orifice i into the mixing chamber 102 where the heated air mixes with the exhaust gas from the exit manifold 100 of the engine passing through the connecting conduit 101. The flow of air through the inspirator 119 induces the flow of added fuel introduced into the inspirator.

Simultaneously with the flow of air through the inspirator 119, fuel from the carburetor (not shown) or the intake manifold may be fed through line 137 controlled by valve 137' and check valve y or alternatively fuel from the fuel tank and/or pump (not shown) may be fed into line 138 controlled by valve 138' and check valve x and may then be passed into line 138''. The liquid fuel (from the tank, etc.) may be both pumped and drawn in through the inspirator by induction and in any event is atomized by the force of the air flowing through the nozzle of the inspirator and later may be vaporized in the mixing chamber 102 or alternatively the liquid fuel may be passed under the force of the fuel pump directly into the mixing chamber by a connecting line (not shown). If desired a special carburetor may be used to feed these fuels. The flow of fuel from either or both of these sources (through lines 137 and 138) may be passed into line 139 and through one-way solenoid valve B. The opeartion of the solenoid valve B will be referred to hereinafter. The fuel then flows through line 139' controlled by valve 139" into the inspirator 119, and then in sequence from the inspirator into the mixing chamber 102 and through connecting tube 103 to the combustion chamber 104 wherein substantially complete combustion of the combustible components of the exhaust gases aided by the presence of auxiliary fuels as required (both primary and secondary) and a controlled supply of air takes place. The hot gases flow from the combustion chamber 104 through connecting line 105 into the heat exchanger 116 to be heat exchanged with the incoming air, and flow out of the system through line 107. The fuels the flow of which is described and noted above may be referred to as primary fuels; and it is noted here that when desired they may be cut off independently by cutting off the operation of solenoid valve B at switch 124" as explained below.

Simultaneously or alternatively as desired waste fuels from the crankcase referred to as blowby, and gasoline from carburetor and tank leakage by evaporation (all of which normally pollute the atmosphere) may be employed as secondary auxiliary fuels and in any event would become secondary pollutants if not collected and utilized. Alternatively as will be described later these pollutant fuels may be during certain modes or phases of the operation of the engine and vehicle and of the apparatus and process of my invention be drawn into the intake manifold and utilized as fuel in the operation of the engine and at the same time avoid their polluting effects in the atmosphere.

The blowby as well as the fuels from leakage by evaporating from the tank and carburetor (by breathing and otherwise) may be collected from the vents thereof and passed through line 132 controlled by valve 132" and check valve z and is passed through two-way solenoid control valve c and through connection 133' into the inspirator 120. The operation of the solenoid valve c will be referred to later. Simultaneously air is drawn off line 130 (leading from line 128) controlled by valve 130' which is then passed through lines 130 and 131" into the inspirator 120 through nozzle n' and neck i², into the mixing chamber 102. A portion of the air may be bypassed through line 131' controlled by valve 131 and into the exhaust line 101. The amount of this air is regulated by valve 115' and valve 131 both manually controlled to take care of the combustion of combustible components normally present in the exhaust gases. The force of the flowing air in the inspirator serves to draw in the secondary pollutant fuels referred to above.

The secondary pollutant fuels (as in the case of the primary fuels) entering the inspirator 120 and mixing chamber 102 pass together with the air and exhaust gases into the combustion chamber 104 and continue as described above for the hot gases leaving the combustion chamber. It is obvious that various crossover lines may be employed to utilize either inspirator for either type of fuel but the use of separate inspirators as described permit the separate handling of the two general types as described below.

The proportions of fuel or combustibles generally to air added should be kept within the limits of inflammability to achieve substantially complete combustion in a practical manner, and while I prefer the means of control of the same described herein other suitable means may be employed.

With regard to the blowby gases as the name indicates they are those escaping unburned from the cylinders of the engine on the upstroke of the pistons into the crankcase and normally through the draft or vent tube of the latter into the atmosphere and they are thus normally a pollutant and a nuisance. It is estimated that they may account for up to 40% of the hydrocarbons escaping from the system and exhausted into the atmosphere including those in the exhaust gas itself; and constitute a nuisance along with the unburned and partially burned hydrocarbons, the carbon monoxide and hydrogen and the finely divided carbonaceous substances in the exhaust gases. They are, however, generally insufficient in quantity to maintain combustion of the undesirable components of the exhaust gases under some of the varied conditions of operation and thus all the mode and phases which make it necessary periodically to add the primary fuel referred to in order to maintain both the desired concentration of combustible and temperature range for satisfactory combustion and conversion of the undesirable components in the exhaust gases. Generally as used in my process the blowby is withdrawn from the crankcase, e.g., through the vent or draft tube of the engine and passed into the system for utilization as described herein.

With regard to the other secondary fuels for the combustion chamber and utilization in the engine, like the blowby as described below, consisting of leakage of gasoline from the fuel tanks and the carburetor. These leakages are normal pollutants and as in the case of the blowby they are to be employed as supplementary fuels for the combustion chamber and alternatively periodically like the blowby they may be diverted to be employed as fuel for engine operation when not required as a supplementary fuel, e.g., at high speeds and under certain conditions of acceleration and deceleration referred to as phases or modes of operation of the automotive vehicle.

The amounts of evaporation from the tank and carburetor when collected for us as a supplementary fuel in the combustion chamber (and as noted alternatively for engine operation) may vary over a wide range dependent on environmental temperature. Also since these fuels are from the normal and same source of supply of the primary fuel, namely, from the carburetor and/or the tank the requirement of the latter for the combustion chamber may be reduced accordingly. These evaporation or leakage fuels normally lost to the atmosphere are collected by being drawn from the respective carburetor and fuel tank vents by the inspirator 120 through line 132 as described using the necessary means and operating precautions to avoid imbalance in normal carburetor operation.

The hot gases leaving the combustion chamber pass through conduit 105 in which is located a thermal switch 123 sensitive to and responsive to temperature conditions in the combustion chamber. This thermal switch as will be described below actuates and energizes the spark plug 108 to ignite the combustible mixture and actuates the solenoid valve A to control the flow of air as well as solenoid valves B and C which control the primary and secondary (blowby and leakage) fuels respectively. The air flow based on the principle and basis of operation of the inspirator controls the flow of fuel to the mixing chamber and combustion chamber. Both the spark plug and the solenoid valves A, B and C are energized when the temperature in the combustion chamber falls below about 1400 to 1450° F. The combustible components in the exhaust gases entering the combustion chamber from the mixing chamber are ignited by the spark plug 108 (or other suitable ignition device) which is actuated or energized by an electrical circuit, preferably operating off the regular battery system. At the beginning of the operation the temperature of the chamber is below that required for steady operation so that the spark plug is energized for intermittent spark on closing the manual switch until the temperature rises above about 1400 to 1450° F. The spark plug which is grounded is connected through line 127" to the ignition system designated as 127' (which in general is of a conventional type, e.g., as described in connection with the parent application) and by line 126 to the thermal switch 123.

Line 126 also connects the thermal switch 123 to solenoid valve B through line 126″ and switch 124″ which controls the flow of primary fuels to the combustion chamber 104 and similarly it connects the thermal switch 123 with solenoid valve C through lines 125‴, 126‴ and 126″. Solenoid valve C controls the flow of secondary fuels to the combustion chamber. The solenoid valve A for air control is controlled by the thermal switch connected through line 126′ and switch 124′ may be disconnected through switch 124′ if desired although this switch is normally closed. It is shown grounded at $g$. The source of power for the spark plug and the solenoid valves A, B and C and D may be the regular storage battery 127 of the engine and vehicle system generally (although if desired a separate battery may be used) and it is connected to the thermal switch through line $l$ and switch 124. The latter is a manual switch for cutoff and control and may be located on the panel. The battery 127 is grounded at $g'$. In the operation manual switch 124 is open and 124‴ (both connected to the battery) is closed. The current normally passes from the battery through switch 124‴ and lines 125″ and $p'$ connected to switch plate 142 of electrical switch 140. The switch plate 142 moves back and forth actuated by link rod 141 (as explained below) in a reciprocating motion between conductor A′ and insulator rest B′ making and breaking the current passing between line 125″ and the battery on the one hand and line 125′ and the thermal switch 123 on the other hand and this results in cutting in and out the operation of solenoids A, B and C and the spark plug through which the air and fuel are fed into the combustion chamber and wherein the secondary fuels (blowby and fuels evaporating from the carburetor and fuel tank are diverted into the intake manifold as described below). Link rod 141 is connected to the switch plate 142 by pivot element $p$. The current passing through the switch plate 142 is insulated from the pivot and link rod and the other elements of the diaphragm control device 135‴ the function of which is further described below.

The conducting switch plate is movable around the fixed axis or pivot $p''$ and normally rests on conducting element A′ through which the current flows to line 125″ and into line 125 connecting with thermal switch 123 which is normally open when the temperature is above about 1450° F., but closes when the temperature falls below about 1450° F. When this occurs all circuits connected thereto will be energized or activated including the spark or ignition plug 108 (connected by line 127″) to the ignition system and the solenoid valves; A (connected by line 126″) and switch 124′ controlling the air supply; and B (connected by line 126″ and 126, through panel switch 124″ which is normally closed) controlling the flow of primary fuel; and C (connected by lines 125‴, 126″ and 126) controlling the flow of secondary fuels which would normally be wasted to the atmosphere. Solenoid valves A, B and C are grounded at $g$, $g''$ and $g'''$, respectively. The air and fuels are directed as described above through their respective inspirators 119 and 120 and to the mixing chamber 102 where all components, the exhaust gas, air and fuels, are mixed and from which they pass to the combustion chamber 104.

As has already been described the central feature of my present invention is substantially complete combustion of the combustible components in the exhaust gases and the use of primary fuels normally of a type and from a source supplied to the engine in addition to the blowby and secondary fuels from the tank and carburetor normally leaking to the atmosphere as required to maintain steady combustion conditions in the chamber. The fuels are fed into the combustion chamber with the necessary supply of air, i.e., a forced supply, to maintain continuous and substantially complete combustion of the undesirable components of the exhaust gases. This is usually required when combustion of the exhaust gases alone is not self-sustaining which is usually the case except when idling and at very low speeds during which the secondary fuels alone will suffice. Also as has been emphasized above that when the content of the combustible components, e.g., carbon monoxide and unburned or partially burned hydrocarbons, etc., in the exhaust gases fall below the concentrations which are essentially unobjectionable, which is generally the case when the vehicle is cruising at relatively high speeds, for example exceeding about 50 to 60 miles per hour and above, it is unnecessary to treat the exhaust gases and to use supplementary primary fuel for this purpose.

Also it may be recognized that the amount of fuel which would be employed is much higher under these conditions than at lower speeds, when supplementary fuels are necessary. Moreover the costs go up proportionately to treat the exhaust at high speeds because of a greater consumption of fuel. Also, there could be less need for special treatment of the exhaust under these conditions on highways where relatively high speeds are tolerated in comparison with urban and suburban driving as both the population density and the number of cars per unit area are lower than in urban areas. A number of control devices is employed under these conditions in connection with my invention which depends on the relationship between exhaust manifold temperature and speed on the one hand or directly on the speed itself. These are shown in FIGURES 1, 2, 2A and 2B and FIGURES 4 to 7, inclusive. There are of course various situations or modes or phases of operation with regard to concentration of objectionable substances of a combustible nature in the exhaust. Some of these for example at very low speeds and during idling may not require the use of primary fuels, i.e., these may not require the use of primary fuels withdrawn directly from the carburetor or fuel tank as described in connection with FIGURE 1. In these cases, they may undergo substantially complete combustion when supplemented by the addition of the above named secondary fuels, i.e. crankcase gasoline in addition to the gasoline which normally evaporates from the carburetor vent and the fuel tank all of which would be normal pollutants.

In the modes and phases of automotive vehicle operations involving urban and city travel on the one hand and on the other suburban and moderate cruising it may be practical to employ as auxiliary fuels only the secondary fuels noted above with the exhaust gases in the combustion chamber during idling and up to about 10 to 15 miles per hour or there about and to use both secondary and some primary fuels as found necessary at about 15 to 30 miles per hour as well as upward to 50 to 55 miles per hour with increasing amounts of the primary fuels as found necessary to the point of cut off at high speeds, etc., of the fuels in accordance with my invention. The latter is done automatically, but the former may require opening of switch 124″ hereinafter referred to, as well as mentioned above.

In the motor vehicle operations where primary fuel addition may be necessary for example from about 10 to 15 miles per hour up to about 50 to 55 miles per hour. When the temperature in the combustion chamber falls below about 1450° F. the thermal switch 123 is activated and in consequence the spark or ignition plug and the three solenoid valves A, B and C are energized. Additional air is supplied through solenoid valve A (a one-way valve normally closed); primary fuel is drawn direct from the carburetor (or intake manifold) or the fuel tank and is supplied through solenoid valve B (a one-way valve normally closed) and solenoid valve C (a two-way valve) supplying secondary fuels including blowby and evaporative leakage from the carburetor and tank. These are collected from the respective vents of the crankcase, carburetor and fuel tank (not shown) supplied through line 132 and then pass through solenoid valve C; a two-way valve communicating with inspirator 120 in one phase and mode of the operation and with the intake manifold 134a in another. In the latter, the secondary fuels are used in the engine. This may be considered a normal operation in connection with my invention. However, when the speed is increased to about 50 to 55 miles per hour, the temperature in the exhaust manifold rises correspondingly as shown above and this correlation between speed of the engine and/or the vehicle and exhaust manifold temperature may be used as described below to automatically cut off the supplementary fuels and additional air normally required for combustion and to divert the secondary pollutant fuels into the intake manifold to be used as fuel to operate the engine as well as to avoid emission of the blowby and evaporation loss to pollute the air.

Referring again to FIGURE 1, line 143' connects with switch 124''' and to the battery 127. Line 143' also connects with 143'' and with temperature responsive switch 143 and probe member 143b located in exhaust manifold 143a. The temperature responsive switch 143 is connected by line 143''' with solenoid valve D and energizes the same when a predetermined exhaust manifold temperature is reached corresponding to a selected speed as discussed above. At this point the solenoid valve D (which is normally closed when the operation above prevails) opens to the intake manifold 134a and to the diaphragm device 135''' which actuates link rod 141 and in turn throws switch 142 which deenergizes or deactivates the spark plug 108 and solenoid valves A, B and C, the functions of which have been described above. The air passing through solenoid valve A is thus cut off, and primary fuel controlled by solenoid valve B is likewise cut off. The blowby the evaporation leakage fuels from the carburetor and tank comprising the secondary fuels are however diverted through line 133 controlled by valve 133'' into the intake manifold 134a to be used as fuels for the engine and to avoid emission into the atmosphere. The vacuum diaphragm control device 135''' consists of a chamber 135 with casing members 135' and 135'' and a flexible diaphragm 136, communicating through a conduit 134 and solenoid valve D to the intake manifold 134a source of vacuum 134a. When the solenoid valve D is activated or energized as described above, the diaphragm device 135''' communicates with the manifold vacuum and when deactivated or deenergized the chamber 135 communicates with the atmosphere, and the solenoid valve C admits atmospheric pressure to chamber 135. The diaphragm device 135 above includes a flexible diaphragm member 136, peripherally secured within the casing members 135' and 135'' with link rod 141 centrally secured to the diaphragm 136. A spring member 134' disposed within the casing, biases the diaphragm to the right which assists in positioning the conductor switch plate 142 on the conductor element A' through the articulated mechanism described above. Check valve W serves to maintain vacuum during various operations of the engine including full throttle.

The principle of the diaphragm device generally has become more or less conventional in various applications in the operation with spark ignition engine automotive vehicles and in this sense its basic design has been proven practical for various uses.

Lines 126''' and 125''' are leads for other uses in the system as required.

FIGURE 2 shows an alternative application of the principle of the diaphragm in combination with a switching element. The control device is essentially as described in connection with FIGURE 1 and with corresponding parts with the exception that the device itself is used in connection with the operation of a combination valve and switch. Conduit 134a communicates with the chamber 136b of the diaphragm device 135a and with the intake manifold. The chamber is defined by the casing members 135b and 135c and flexible diaphragm member 136a secured between the casing members and spring member 136c with link rod 141a centrally secured to the flexible diaphragm member. The operation as well as the functioning of the various elements of the device is to this point the same as described in connection with FIGURE 1. The link rod 141a, however, is pivotally connected by movable pivot p''' to lever or cross rod l' which is affixed to valve core 144'. The latter is free to rotate within valve 144 which is in fixed position in response to movement of the link rod 141a. This changes the direction of flow of the gases and vapors flowing through the valve passages as illustrated in FIGURES 2a and 2b.

Switch blade 142a is affixed to the lower end of lever or cross arm l' and functions like 142 in FIGURE 1 moving with the movement of the lever l' from a position where current is flowing through it similar to A' in FIGURE 1 to a 'dead" position indicated by B' in FIGURE 1 to insulate the switch blade from the lever l' and other elements in FIGURE 2, lead p''' connected to the switch blade corresponds to p' in FIGURE 1.

From the above description it may be seen that while not equivalent to the control systems described in connection with FIGURE 1, the control device shown in FIGURE 2 may be used as an alternative and will function to perform the same purposes, e.g., when applied to FIGURE 1 it would switch off the current through line 127'' and through the thermal switch 123 when closed which normally permits flow of the current and as a result will shut off the flow of air through solenoid valve A and of the primary fuel through solenoid valve B and would divert the flow of the secondary fuels through solenoid valve C (which normally is open to the inspirator 120 in FIGURE 1) to line 133 and valve 133'' into the intake manifold 134a.

FIGURE 2a shows the direction of flow of the secondary fuels to the inspirator (and finally to the combustion chamber). In FIGURE 2a the secondary fuels pass through line 132a and on through the path 144a in the valve core 144' and line 133a leading to the inspirator.

FIGURE 2b shows the direction of flow of the secondary fuels after the switch blade has been moved to the "dead" position d; during this period the secondary fuels are flowing through 132a and through 133a to the vacuum line and intake manifold.

The functioning in both FIGURES 2a and 2b depends upon the rotation of the valve core $144^a$ and $144^b$ in the manner described.

FIGURE 3 is a simplified and less expensive alternative for the heat exchanger shown in FIGURE 1. It has unique advantages described below and in addition may serve as a resonator which together with the combustion chamber (containing refractory elements referred to above) may perform the function normally done by the muffler and resonator.

In the heat exchanger resonator 146 the exhaust from the combustion chamber 104 consisting of the hot products of combustion leaving the combustion chamber 104 through line 105 enter the heat exchanger at 105'. It then passes through the conduit and heat exchanger element 147 in heat exchange with the incoming air entering at 145 and leaving at 145' and to the combustion chamber as described in conjunction with FIGURE 1.

In this process the hot gases are cooled before being exhausted through exit 107' to the atmosphere from the tail pipe of the vehicle and the incoming air is preheated resulting in more efficient combustion and a saving of fuel. In the passage of the hot gases through the heat exchanger they are caused to flow in and out of the hollow fins 148 of the heat exchange conduit element 147. This type of flow neutralizes the sound and brings about a muffling effect, and at the same time increases the surface and time for improved heat exchange. Simultaneously passage of the air over the outside surfaces of the hollow fins due to increased surface and time of contact likewise improves the heat exchange from the hot gases to the air resulting in overall efficiency. The heat exchanger like that shown in FIGURE 1 and like the combustion chamber may be insulated shown at 147′. The main body or shell of the heat exchanger indicated at 149′ and the connections which may be integral at 145 and 145′ is preferably made of heat and corrosion resistant alloy steel. The outer shell which may be made of thin metal shown at 149 serves to retain and protect the insulation.

FIGURES 4 to 7, inclusive, represent alternative control systems to the diaphragm control device shown in FIGURE 1. The control systems shown in FIGURES 4 to 7 generally relate to the speed of the engine and of the vehicle generally in the case of FIGURE 4, and/or the temperature of the gases in the exhaust manifold (which is in turn related to speed) in the case of FIGURES 5, 6 and 7. The operations of the systems relate in general to the cutting out of the thermal switch (shown at 2 in FIGURE 4 and at 123 in FIGURE 1) at a predetermined exhaust manifold temperature (or as in the case of FIGURE 4 at a predetermined speed) thus cutting off the solenoid controls A and B which control the flow of air and primary fuels and the sparkplug.

Also valve C, the valve which controls the flow of the secondary fuels (blowby and carburetor and tank evaporation) when the speed exceeds a predetermined value, e.g., 55 to 65 miles per hour. At the same time the secondary fuels are diverted to the intake manifold to utilize the same as fuel for the engine and to avoid emission of these undesirable pollutants by hydrocarbons to the atmosphere. This speed may be set at any value and it in turn as pointed out previously corresponds to more or less definite temperature depending to some degree on the type of engine and the exhaust manifold. In any event the latter temperature generally increases in a regular relationship with speed. Also with increase in speed, e.g., from about 55 to 60 miles per hour and upward (in which, there is a corresponding increase in the exhaust manifold temperature) the objectionable components of the exhaust gases (carbon monoxide, and unburned and partially burned hydrocarbons) may be reduced in the exhaust gases due to more efficient combustion in the engine to a point where the combustible components of the exhaust gases do not have to be burned in the combustion chamber and as it so happens this occurs during cruising on the open highways where the extent of pollution is much less objectionable than in the populous urban districts. It is pointed out that in FIGURE 4 the operation utilizes the speed relationship by the use of a special speedometer device for control whereas in the other FIGURES 5, 6 and 7 the exhaust manifold temperature is utilized.

It is also noted in connection with FIGURES 4, 6 and 7, and to a less flexible extent in FIGURE 5, that when related to the overall operation as shown in FIGURE 1, i.e., substituting the corresponding operations therein which is indicated in the detailed description of FIGURES 4, 6 and 7 all of the systems or devices shown in each of the FIGURES 4, 6 and 7 can be used to perform the functions of the vacuum diaphragm control device for example, not only to divert the secondary fuels from the inspirator in FIGURE 1, but also to cut in and out the solenoid valves A and B controlling air and primary fuel supply (as needed) for the combustion chamber respectively as well as the spark or ignition plug 108. It is emphasized however that none of the systems is equivalent to each other, and in this respect independent.

Referring now to FIGURE 4 which utilizes a speedometer device 8 (which may be of a conventional type, for example, properly geared by cable to elements of the engine or transmission to indicate the speed or one which serves the same function of indicating speed), the current flows from the battery 11 grounded at $g5$ (switch 12 being closed and 12′ open) through line 10 which is attached to the speedometer needle 8′ at 10′. The needle is metal and conducts the current to metal conductor scale 6. The upper end of the needle making contact with the scale (as well as the scale itself) is insulated from the rest of the speedometer system, for example, in the case of the needle, by element 9. The current passes through the metal scale 6, as long as it does not exceed the predetermined speed (shown at 55 miles per hour and above, as illustrated) but which of course may be set otherwise as desired, and from the conductor scale the current passes through line 5 to line 3 which connects with the thermal switch 2. The latter located in the outlet 1 of the combustion chamber is open above a temperature in the combustion chamber of about 1400 to 1450° F. but closes and permits flow of the current through lines 4 and 4′, which when properly connected as indicated may control solenoid valves A and B and spark plug 108 in FIGURE 1. Line 13 leading off line 4′ connects to two-way solenoid valve 14 grounded at $g6$ and maintains it (when current is flowing) in an energized condition during which the secondary fuels (indicated) entering at 15 flow through line 16 into the inspirator (shown in FIGURE 1 at 120). When the needle indicates that the predetermined speed is exceeded and passes this speed mark on the conductor scale and on to the insulator portion of the scale the current is broken and the two-way solenoid valve 14 is deenergized and the secondary fuels flow through lines 17 and 19′ into the intake manifold 19 to be utilized by the engine. Check valve 17 controls the flow of the fuels into the intake manifold. It is noted that both the "vacuum" intake manifold and the inspirator action cause positive flows of the secondary fuels in the directions noted. It is also noted that when the system in FIGURE 4 is incorporated in the operation described in FIGURE 1 with proper consideration of similar functions line 13 connected to line 4′ will activate or energize the primary fuel solenoid valve B, line S the spark plug 108; and line A to the solenoid valve A controlling the air supply in FIGURE 1. Alternative to the operation described in connection with FIGURE 4 switch 12 may be opened and switch 12′ closed and the functions of the control system described in connection with FIGURE 1 will be performed except the diversion of the secondary fuels (as this control is switched off in the transposition of switches 12 and 12′). When switch 12 is closed and 12′ opened the operation proceeds as described initially.

FIGURES 6 and 7 have the same flexibility of operation as described in connection with FIGURE 4 when the speed (or the exhaust manifold temperature) controls are cut out by suitable switches as described in FIGURE 4 and shown in the drawings. FIGURE 5 to be described later is operable for the purpose but is less flexible in connection with the alternative operation shown in connection with the other systems, namely, FIGURES 1, 2, 4, 6 and 7. It is noted that while it is included as an alternative the others are preferred.

Referring to FIGURE 6, 11c is the battery grounded at $g11$ (switch 55 being closed) and the current passes through lines 54 and 53 and through temperature responsive switch 52 with probe 52″ located in the exhaust manifold. This particular switch is of the type which is closed normally to pass the current through line 51 to line 49 and through thermal switch 2ᵇ located in conduit 1ᵇ for the hot gases of combustion leaving the combustion chamber. When the thermal switch is closed (when the temperature in the combustion chamber falls below about 1450° F.) the current passes through lines 50, 50′ and 56 and energizes two-way solenoid valve 57 so that the secondary fuels (blowby, and carburetor and tank evaporation or leakage) from line 58 pass through line 60 to the inspirator (120 in FIGURE 1) as previously outlined in connection with FIGURE 4. When the temperature in the exhaust manifold reaches a predetermined temperature (corresponding to a relatively high speed also predetermined as outlined in connection with FIGURE 4) the temperature responsive switch 52 opens and the circuit is broken and the two-way solenoid valve 57 is deenergized. When this occurs the secondary fuel vapors are diverted from the inspirator and pass into the intake manifold 59 through line 58″ controlled by check valve 58′ to be used as engine fuel. The reverse operation occurs when the temperature in the exhaust manifold drops below the predetermined temperature referred to above. Also with the exception of cutting out the control system when the temperature in the exhaust manifold rises above the predetermined point (corresponding to a relatilvey high speed) and when switch 55 is open and switch 55' closed, the system otherwise operates as described above, and in connection with the description of FIGURE 4. Also comparable to FIGURE 4 line A'' off line 50 controls the air supply, line B'' off 50' controls the primary fuel supply and S'' the spark plug in the combustion chamber. The system for control of the secondary fuels under these circumstances operates as previously described.

FIGURE 7 like FIGURE 6 employs the principle of control by the exhaust manifold temperature corresponding to speed and ultimately in all of the cases indirectly to composition of the exhaust gases as already set forth with respect to undesirable components. The battery is shown at 11$^b$ grounded at $g9$ switch 39 is open and 39' is closed and the current passes through line 40' and 40 (40'' being a lead) through temperature responsive switch 41 with probe 41'' in the exhaust manifold 41'. The current in this case does not normally pass through temperature responsive switch 41 until the predetermined temperature is reached at which point, it closes and passes the current through line 42' and 38' to mercury switch 37. At this point the current passing from the battery through lines 40' and 38 through the mercury switch 37 and line 36 and 35' to the thermal switch (2c in the conduit 1c leaving the combustion chamber) is broken and all circuits depending upon the thermal switch (which is normally closed at temperatures below about 1450° F.) are cut off. This includes the current passing through line 35'' and through line 42 to the two-way solenoid valve 45 (grounded at $g10$) which when energized passes the secondary fuels (blowby and carburetor and tank leakage) from line 43 through line 45' to the inspirator (shown at 120 in FIGURE 1) is deenergized and in this condition diverts the secondary fuels through line 46 and check valve 48' into the intake manifold 48. Simultaneously, lines A''' and B''' controlling the air and primary fuels respectively are cut off as described in connection with FIGURES 4 and 6 and the spark plug 108 (all shown in FIGURE 1). The two-way solenoid valve 45 corresponds to solenoid valve C in FIGURE 1, and the secondary fuel system in FIGURE 7 corresponds in general to that in the others described, alternatively passing these fuels to the inspirator and to the intake manifold as described. Also when switch 39 is opened and 39' closed the current passes through line 39'' and the system in general operates as in the similar situations described for FIGURES 4 and 6 without the speed and exhaust manifold temperature controls.

FIGURE 5 referred to above which while operative (is the least preferred of the other systems described for control) is however included as an alternative. The battery is shown at 11$a$ with ground $g7$. Switch 26 is normally closed and 26' open. The current passes through line 20 with electrodes 20' and 24' across the mercury shown in manometer 29 with legs 29' and 20' at a level to begin with so that the electrodes are immersed and conduct the current. The current thus passes from line 20 to line 24 and to line 22 and across the thermal switch 1$a$ located in the conduit 2$a$ through which the hot gases from the combustion chamber pass. When the temperature in the combustion chamber falls below about 1400 to 1450° F. the switch is closed and simultaneously current is passed through two-way solenoid valve 28 (which is normally open to the passage of secondary fuels from 28' to the inspirator through line 33) is closed to the inspirator and is opened for the passage of secondary fuels through line 30 and check valve 31 into the intake manifold 32 (for use as fuel for the engine). When temperature responsive switch 26 with probe 27' closes (at a predetermined temperature corresponding to relatively high speeds) it permits passage of current from the battery through line 25'' and line 25 (25' is a lead) and through the temperature responsive switch 26 to two-way solenoid valve 28 energizing the later and diverting the secondary fuels from the inspirator to the intake manifold as described. Simultaneously the mercury in leg 20'' of the manometer is depressed by the vacuum in 30' and the mercury level is lowered to break the mercury conductor between the electrodes which cuts off the current to line 22 and to the thermal switch 1$a$ and lines 23 and 23'. This also causes the break in current through lines A', B' and S' controlling the air and primary fuels through their respective solenoid valves as shown in FIGURE 1.

Regarding various elements referred to above in connection with my invention the following may be noted.

The function of the thermal switch which is sensitive and responsive to temperature changes in the combustion chamber is generally known and likewise that of the spark plug or ignition means generally. Both are available in various forms and should be selected on a basis of reliability and practicality. Various devices may be employed for observation or control for example a pyrometer in the combustion chamber attached to the $a$ meter which may be on the panel. Also reliable observation and recording devices are available in connection with the operation of the various devices and systems referred to herein.

The use of check valves as shown in the drawings in FIGURE 1 and flow of materials, while (they are) desirable in some instances they are not entirely necessary in other cases. However, they emphasize the desirability of one direction flow (or preventing reverse flow) which in some cases is an especially desirable safety measure to prevent undesirable back flow and flash back. Their use is of course optional as required.

Reverting to the use of the inspirator in the control of fuel addition to the air/exhaust mixture as a feature of my invention as illustrated especially in the flow of the fuels and air in FIGURE 1 which includes control of the added primary fuel as well as the secondary pollutant types such as blowby, etc.; and more particularly the use of the inspirator for this purpose in conjunction with and coordinated with the use of a forced supply of air the following is noted: In the inspirator tube as illustrated in FIGURE 1 the velocity of the flowing gas increases greatly from the entrance or wide end through the narrow or constricted throat or orifice. This is particularly important as the forced air supply itself is flowing at a relatively high but controlled velocity through the nozzle into the inspirator tube and draws the fuel in and with it. The rate of air flow may be controlled by the valves and is directly coordinated with the flow of fuel and in effect the energy imparted to the flowing air may in turn be transferred to the fuel in the desired manner, i.e., increase of air flow results in increased fuel flow.

The control of the secondary fuels from the crankcase and the vents of the carburetor and fuel tank are likewise to be carried out without disturbing the balance and normal functioning of these elements and aside from control and check valves various other devices have been reported available for this purpose. Also, the rate at which the primary fuels are drawn in is to be balanced between the need to maintain proper combustion temperature in the combustion chamber (and proper functioning of the normal engine operation) as well as a proper balance between fuel and air.

The safety screens or flame arresters shown in the drawings of FIGURES 1, 3 and 4 in the conduit from the mixing chamber to the combustion chamber likewise illustrate safety measures and are quite desirable to prevent back fire or flash back or retrograde from the combustion chamber. The drawings show single screens or units but a plurality of these screens may be employed at the extreme downstream portion of the mixing region or mixing chamber. These safety screens or flame arresters illustrate a well-known principle. The flame arresters may comprise a standard high temperature resistant wire mesh or screen of the steel wire gauze-type material or the like. They may be fitted into suitable frames and may be optionally used fixedly secured transverse to the path of flow of the combustible gases or mixture containing the same before leaving the mixing chamber and entering the combustion chamber. It is noted also that such flame arresters function to prevent premature ignition of an overly rich mixture which might collect. Alternative types of flame arresters may also be employed.

It is also to be noted generally that while I have illustrated and prefer the use of an electrically energized activated type of solenoid valve to regulate the flow of supplementary fuel and air supply, other means are available. It is recalled in this connection that the manually controlled valves of various and suitable conventional types (including in special cases throttle valves) may be set for normal requirements. Where conditions require additional fuel or air responsive to temperature drops in the combustion chamber as described above the use of an automatic valve of the solenoid type has also been described as suitable for this purpose in which case the manually controlled valve may be set to admit a predetermined supply of air and in some cases gasoline and air mixture, in addition to the secondary fuels). As an alternate to the solenoid valve certain mechanical or automatic types of valves generally responsive to temperature changes in the combustion chamber operated in conjunction with the thermal switch or bimetallic elements may also be employed either alone or in combination with the solenoid. Generally these mechanical devices may be coordinated with the intake manifold vacuum line of the engine utilizing diaphragm or bellows devices, the principal novelty of use however may reside in the particular manner in which they are employed, and the other objectives accomplished by their use.

While the preferred temperature limits in the combustion chamber may be between about 1450 to about 1650° F. it is noted that the temperature within the combustion chamber may at times go even above the upper limit mentioned of about 2200° F. and in general the upper temperature limit is set both on a basis of fuel economy as well as on the basis of the material requirements including both the metal of which the combustion chamber is made as well as the refractory materials which may be used especially including some of the latter materials which in some cases may have substantial catalytic properties in promoting combustion. With regard to the semicatalytic properties of the refractory terials employed by me and in confirmation thereof the following is quoted from Fuels, Combustion and Furnaces (Griswold, McGraw-Hill, 1946, p. 210):

"A hot refractory surface receives heat from flame and transmits it to colder portions of a burning mixture, increasing the rates both of ignition and combustion. The influence of the hot refractory is so pronounced that the effect has been designated surface combustion. Silica, fire clay and probably other refractories definitely catalyze combustion chain reactions at temperatures of 400 to 700° C. (about 1390 to 2360° F.)."

With regard to the metal of which the chamber is made it is desirable to employ high temperature alloys even though the chamber may be lined with ceramic or other types of linings or coatings. This not only assures resistance to high temperatures, but also to oxidation of the metal and minimizes warping of the chamber. A large number of such alloys which may contain chromium, cobalt, nickel and other additives (and are sold under trade names such as Chromalloy, Hastelloy, Inconel, and various stainless types) are available and their use is preferred.

The above generalized discussion will fully illustrate that I may in general employ conventional or other alternative means when desirable or convenient to those described above to accomplish the desired objective although those disclosed by me are preferred.

OPERATING CONDITIONS AND EXAMPLES

It is in one aspect the essence of my invention that the operation of the internal combustion engine and accompanying vehicle be carried out in an efficient and convenient manner to accommodate starting and stopping and varying rates of speed without specific regard to composition of the exhaust gas in doing so; but in all cases thereafter taking the necessary steps and utilizing the means of overcoming the objections to the exhaust gases.

The operating conditions within the combustion chamber to accomplish the above aims especially the preferred temperature range of about 1400° F. to 1450° F. and up to about 1650° F. More generally however the extremes may be between 1400° F. to 2000° F. The aim with regard to existing pressures in the entrance of the combustion chamber and exit and in the system generally has already been described as very little departure from that existing in the conventional muffler system, for example at the entrance and exit of the muffler and tail pipe varying only from slightly above atmospheric pressure at the entrance to substantially about atmospheric pressure at the exit. The main objective of course is to disturb the operation of the engine as little as possible and to maintain it within practical limits with regard to existing pressures. I may however vary these pressures within operating limits.

AIR-FUEL RATIOS

In order to obtain complete combustion in the combustion chamber it is desirable to maintain some excess of air over the theoretical required for combustion. This normally demands a variable air supply and air-exhaust ratio over a relatively wide range which has been found difficult to do in the conventional relatively low temperature (about 800° F. to about 1400° F.) catalytic processes because of the objectionable combustibles in the exhaust gases are highest when the engine is idling and under heavy traffic conditions and a relatively high ratio of air to exhaust is required to oxidize the same; and because of a rapid temperature rise in the exhaust gases and of the catalyst when the latter is used due to the rapid oxidation reaction which may even get out of control for satisfactory operation since the catalyst is sensitive to temperatures above about 1300° F. to 1700° F. and its effectiveness may even be destroyed or greatly deteriorated even below this range. Even at high speeds when the combustibles in the exhaust and the air requirement are at a minimum a substantial excess of air could cool the catalyst below the minimum temperature at which it is effective and the sensible heat normally provided by the hot exhaust is insufficient due to the cooling effect to maintain the desired reaction.

It is also noted that the catalysts used in connection with catalytic oxidation processes, and where leaded gasolines are used, are very sensitive to deposition of lead oxide and other lead compounds and are greatly depreciated thereby. This is not so in my process since the combustion of leaded gasoline in the engine and the resulting lead oxides in the exhaust do not adversely affect the efficiency of combustion in my process or of the refractories when used by me.

In my invention the temperature limitations (imposed upon the catalyst noted above) are not present as the effective operating range is from about 1400° F. to 1500° F. in the low range and up to 2000° F. more or less in the upper range; and the surface combustion refractory material which in this sense functions as a semi-catalyst or quasi-catalyst to facilitate the combustion process generally, is not affected by these higher temperatures and this problem is eliminated. Moreover since additional fuel is added in the form of secondary fuels and as found necessary, supplementary carburetor fuel air mixture or the liquid fuel, e.g., direct from the gasoline fuel pump or the tank may be provided to the combustion chamber as described. The conditions referred to above where the combustibles in the exhaust gases are at a minimum (or for the intermediate cases) are absent in my method and process. In this connection the addition of the secondary fuels noted above are insufficient to meet the requirements for the varied conditions and ranges of compositions of the exhaust with respect to the combustible content (notably the intermediate range) existing in the operation without the use of added fuel of a primary type referred to above.

The fuel added is under control at all times and is not affected by any changes in the combustible content of the exhaust gases. Therefore the air exhaust ratio may be correlated to supply sufficient air through the bypass line as described to maintain a sufficient excess for complete combustion with the maximum normal combustible components in the exhaust gases (from about 4.5% to 9% carbon monixode, about 2% to 4% hydrogen and about 0.1 to 0.5 of hydrocarbon vapors, all by volume), and when the combustible content of the exhaust falls below that which requires no treatment, which occurs at noted at relatively high speeds the combusiion system is automatically cut out and the secondary fuel diverted to the intake manifold. With the exception of the last situation referred to above it is preferable to maintain the total concentration of combustibles above the minimum flammable limit and in this connection it may be noted that my process has a high degree of flexibility in this respect due to control of the combustible content of the exhaust gases with respect to hydrocarbons by the addition of both the secondary and primary fuels; as well as of the additional air requirement. It is also noted in this connection that at the temperature prevailing during normal operation of my process (above about 1450° F.) and in the presence of the refractories of the types described in the combustion chamber, oxidation of the carbon monoxide and other combustibles noted will proceed substantially to completion as a result of the semi-catalytic or quasi-catalytic effect and surface combustion and of combustion generally.

Generally it has been found by me that the addition of air in the range of about 30% to 80% (and upward) and preferably between 50% and 80% based on the volume of the exhaust gases and in general sufficient or somewhat in excess for the added combustibles will meet the requirements, and the arrangements and the system are provided to supply the air as required; also it is noted that, normally, added fuel may be approximately of carburetor composition and carries its own air supply, although other primary fuel may be employed in addtion to the pollutant fuels, which require additional air, to take care of the added fuels apart from that required for the exhaust gases indicated above.

SPECIFIC EXAMPLE

In an operation as an example employing an approximately air-fuel ratio of from 13:1 to 15:1 by weight under idling conditions and at very low speeds the analysis of the exhaust gases from an automobile (with engine of the spark ignition type) without treatment may show from 6 to 9% of carbon monoxide and about 3% hydrogen and about 0.2% hydrocarbons all by volume. Under relatively high speed cruising conditions these concentrations as stated above would be considerably diminished but the average under all driving conditions including stopping and starting in heavy traffic and in general for intermediate situations may amount to about 4% carbon monoxide, 2% hydrogen and about 0.1% to 0.2% hydrocarbons in addition to partially oxidized hydrocarbons and carbonaceous substances in both cases.

The following analysis shows the relative effect and distribution of the addition of primary and secondary fuels to the exhaust gases to maintain suitable combustion conditions and to achieve substantially complete combustions of the combustibles in the exhaust gases to purify the same as well as to illustrate the application of my invention.

This analysis applies particularly to the operation of an automotive vehicle with spark ignition type engine operating in the intermediate range of about 20 to 40 miles per hour (but is applicable with appropriate modifications to varying operations on both sides and of course takes into account approximate combustible contents of the exhaust gases as well as requirements for added fuels in accordance with my invention).

In a typical operation related to added fuel requirements for the combustion chamber: The required temperature rise in the combustion chamber to maintain the required temperature conditions may be based on the following. The fuel consumption for the automotive vehicle averages about 7 gallons (about 50 lbs.) per 100 miles. The total weight of the exhaust employing an air fuel ratio of 13:1 to 15:1 would be approximately 800 lbs. The total heat requirement (including credit for heat recovered from the hot gases leaving the combustion chamber for heating the incoming air) would require about 1.2 gallons of gasoline, i.e., about 8.4 lbs. This includes both primary and secondary fuels. The secondary fuels would be equivalent to the use of about 2.5 lbs. of fuel per 100 miles and the estimated fuel equivalent of the combustibles in the exhaust gases per 100 miles is about 4.0 lbs. This is a total of about 6.5 lbs. to be credited to the 8.4 lbs. requirement which leaves about 2 lbs. (about 0.3 gallon) of primary fuel per 100 miles required under these conditions as make-up fuel. Available data show that the total loss of hydrocarbons from the exhaust, the crankcase and the evaporation losses from the carburetor and tank vents amount to 500 lbs. per car per year, the total loss averaging about 10% of the fuel consumption for each car. Of this amount it is estimated that about 6% is in the exhaust gas; 2.4% in the blowby and 1.6% in the loss by evaporation from the carburetor and fuel tank vents, totaling 10%. All of these data are subject to considerable variation on an individual basis, e.g., the hydrocarbons in the exhaust depends on the variables already pointed out and the evaporation losses from the carburetor and fuel tank depend largely upon the temperature.

It is noted in the above example that the secondary fuels are insufficient to maintain steady combustion under all necessary conditions. Both of these types of fuels (primary and secondary) are used operating under the described conditions of substantially atmospheric pressure and a normal temperature range of about 1450° F. to 2000° F. (and preferably with a maximum of about 1650° F.) in the combustion chamber with additions of the secondary fuels and periodic additions of primary gasoline-air mixtures of carburetor composition or from the tank (which would otherwise be supplied to the engine) when the temperature drops below about 1450° F. In the above operation a reduction of the carbon monoxide content from an average of about 4% to less than about 1% (and in general less than about 0.5% with substantially complete combustion) may be obtained depending upon operating conditions. The carbon monoxide and the carbonaceous materials and the other combustibles in the exhaust including hydrogen and hydrocarbons, all of which is originally in the exhaust as well as the added fuel added both primary and secondary types may be substantially converted to water and carbon dioxide in the operation. All hydrocarbon types may be reduced to the requirements of less than about 275 parts per million in the outgoing exhaust gases.

It is noted also that the devices employed for cutting off the added primary fuel (in effect cutting out the combustion chamber) and simultaneously diverting the secondary fuel to the intake manifold will effect a further saving in the requirement of primary fuel dependent of course on the relative amount of travel at the lower speeds and the high speeds at which the exhaust gases may not require treatment. The amounts of carbon monoxide and hydrocarbons in the exhaust gases under these conditions correspond to the naturally lower content which in turn depends upon the speed.

The expression "forced air supply" generally refers to a supply of air originating from a compressor, blower, pump, fan and other similar means with moveable or moving parts or elements which impart to the air (by compression or otherwise) a substantial force and an increased supply of air per unit time when compared to an induced flow, e.g., by the natural flow of the exhaust gases which is insufficient for the purpose. This provides an ample and controlled supply of air and permits the use of the inspirators of a simple and low cost device in combination with the forced supply of air to be used in a practical manner to accomplish the purpose instead of more expensive and complicated equipment.

By the expression "added fuel of the type and from a source supplied to the said internal combustion engine" is meant a primary fuel added to the exhaust gases undergoing treatment, normally a gasoline in the case of spark ignition engine which may be drawn directly from the carburetor or intake manifold of the latter or alternatively initially a liquid from the gasoline pump or tank. By the expression secondary or pollutant fuel added to the exhaust gases which normally is exhausted or leaked by evaporation to the atmosphere as a pollutant from the crankcase, or the carburetor and fuel vents which are recovered and added to the exhaust gases undergoing treatment primarily to avoid a nuisance to the atmosphere. These may alternatively be referred to by the names "crankcase gasoline" or "blowby" in the first instance and as leakage or evaporation fuels from the carburetor and fuel tank vents. It is noted that the secondary fuel designation applies only to the amounts of the latter which would normally leak by evaporation, etc., to the atmosphere.

By the term refractory materials as used in the claims I mean materials of the type described which are not damaged by heating to temperatures even above the maximum employed by me and for example of the types set forth and described by Etherington, Modern Furnace Technology (2d ed., 1944, pp. 379–436) and Griswold, Fuels, Combustion and Furnaces, McGraw-Hill, 1946, pp. 333–357, with such other variations as have been referred to herein.

It is noted that my process may also be applied to aircraft of various types and to many industrial processes and uses wherein objectionable gases and odors are produced which should be eliminated and I intend to utilize the same in this connection.

I claim:
1. In combination with an internal combustion engine and a vehicle powered thereby having a conduit for conveying exhaust gases from the exhaust manifold of the said engine to an exhaust purifier, the improvement which comprises a combustion chamber with an inlet and an outlet through which the exhaust gases are passed, means to supply a forced flow of air to the combustion chamber and separate means to supply a flow of added fuel to the said combustion chamber, means to control said fuel and air supply means responsive to a predetermined minimum temperature condition in the said combustion chamber required for substantial conversion by combustion of undesirable components in the said exhaust gas, ignition means located within the combustion chamber to ignite the combustible materials entering the chamber and means for discharging the purified exhaust into the atmosphere, and means to cut off the said supply of added fuel in the combustion chamber responsive to a condition substantially indicative of a predetermined temperature in the exhaust manifold.

2. The apparatus according to claim 1 wherein the engine includes an intake manifold, and the added fuel includes a secondary fuel, said cutoff means including means to divert said added secondary fuel from said combustion chamber to said intake manifold.

3. The apparatus according to claim 2 wherein said cutoff means is actuated by means responsive to intake manifold vacuum.

4. The apparatus according to claim 3 wherein said intake manifold vacuum responsive means includes a diaphragm, an electric switch responsive to the movement of said diaphragm, and electric control means responsive to said switch.

5. In combination with an internal combustion engine and a vehicle powered thereby having a conduit for conveying exhaust gases from the exhaust manifold of the said engine to an exhaust purifier, the improvement which comprises a combustion chamber with an inlet and an outlet through which the exhaust gases are passed, means to supply a forced flow of air to the combustion chamber and separate means to supply a flow of added fuel to the said combustion chamber, means to control said fuel and air supply means responsive to a predetermined minimum temperature condition in the said combustion chamber required for substantial conversion by combustion of undesirable components in the said exhaust gas, ignition means located within the combustion chamber to ignite the combustible materials entering the chamber and means for discharging the purified exhaust into the atmosphere, and means to cut off the said supply of added fuel in the combustion chamber responsive to a predetermined speed of the said vehicle.

6. Apparatus according to claim 5 which includes speedometer means wherein said cutoff means is actuated by means responsive to said speedometer means which includes an electric switch responsive to a speedometer and electric control means responsive to the said switch.

7. The apparatus according to claim 5 wherein the engine includes an intake manifold, and the added fuel includes a secondary fuel, said cutoff means including means to divert said added secondary fuel from said combustion chamber to said intake manifold.

References Cited

UNITED STATES PATENTS 2,953,898  9/1960  Cornelius _____ 60—30
3,285,709  11/1966  Ennarino _____ 60—30 X AL LAWRENCE SMITH, Primary Examiner DOUGLAS HART, Assistant Examiner